(12) United States Patent
Kim et al.

(10) Patent No.: US 12,039,109 B2
(45) Date of Patent: *Jul. 16, 2024

(54) SYSTEM AND METHOD OF DETERMINING INPUT CHARACTERS BASED ON SWIPE INPUT

(71) Applicant: SAMSUNG ELECTRONICS CO., LTD., Suwon-si (KR)

(72) Inventors: Jung-wook Kim, Seoul (KR); Hui-won Yun, Seoul (KR); Hae-jun Lee, Yongin-si (KR); Ho-jin Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,167

(22) Filed: Nov. 29, 2021

(65) Prior Publication Data

US 2022/0083153 A1    Mar. 17, 2022

Related U.S. Application Data

(63) Continuation of application No. 15/995,841, filed on Jun. 1, 2018, now Pat. No. 11,188,158.

(Continued)

(30) Foreign Application Priority Data

Sep. 5, 2017   (KR) ........................ 10-2017-0113345

(51) Int. Cl.
*G06F 17/00*   (2019.01)
*G06F 3/023*   (2006.01)
(Continued)

(52) U.S. Cl.
CPC ........ *G06F 3/0237* (2013.01); *G06F 3/04883* (2013.01); *G06F 3/04886* (2013.01);
(Continued)

(58) Field of Classification Search
None
See application file for complete search history.

(56) References Cited

U.S. PATENT DOCUMENTS 5,570,462 A   10/1996  McFarland
7,706,616 B2   4/2010  Kristensson
(Continued)

FOREIGN PATENT DOCUMENTS

CN    104035709 A   9/2014
EP      2698692 A1   2/2014
(Continued)

OTHER PUBLICATIONS

Communication dated Oct. 29, 2018 issued by the International Searching Authority in counterpart International Application No. PCT/KR2018/006984 (PCT/ISA/220, PCT/ISA/210, and PCT/ISA/237).

(Continued)

*Primary Examiner* — Mustafa A Amin
(74) *Attorney, Agent, or Firm* — Sughrue Mion, PLLC

(57) ABSTRACT

Provided are an artificial intelligence (AI) system and an application thereof, which simulate functions of a human brain, such as recognition and determination, by using a machine learning algorithm, such as deep-learning. A method of processing, by a device, a keyboard input, based on training, may include: displaying a keyboard on a screen of the device; receiving a swipe input of a user, the swipe input connecting a plurality of keys on a displayed keyboard; extracting a trajectory connecting the plurality of keys; applying, to a trained model for a keyboard input, (Continued)

based on the trajectory, trajectory information indicating a shape of the trajectory and a relative position of the trajectory with respect to the keyboard; and determining at least one character corresponding to the trajectory, based on a result of the applying the trajectory information.

14 Claims, 14 Drawing Sheets

Related U.S. Application Data

(60) Provisional application No. 62/514,136, filed on Jun. 2, 2017.

(51) Int. Cl.
*G06F 3/04883* (2022.01)
*G06F 3/04886* (2022.01)
*G06N 3/044* (2023.01)
*G06N 3/08* (2023.01)
*G06N 3/084* (2023.01)

(52) U.S. Cl.
CPC ............... *G06N 3/044* (2023.01); *G06N 3/08* (2013.01); *G06N 3/084* (2013.01)

(56) References Cited

U.S. PATENT DOCUMENTS

| | | | |
|---|---|---|---|
| 8,701,050 | B1 | 4/2014 | Starner et al. |
| 9,021,380 | B2 | 4/2015 | Zhai et al. |
| 9,134,810 | B2 | 9/2015 | Griffin et al. |
| 9,223,497 | B2 | 12/2015 | Pasquero et al. |
| 9,310,889 | B2 | 4/2016 | Griffin et al. |
| 9,374,547 | B2 | 6/2016 | Lee et al. |
| 2013/0326430 | A1* | 12/2013 | Devi ................ G06F 40/14 715/863 |
| 2014/0028603 | A1* | 1/2014 | Xie ................ G06F 3/0237 345/173 |
| 2014/0071055 | A1 | 3/2014 | Hsieh |
| 2014/0082545 | A1 | 3/2014 | Zhai et al. |
| 2014/0115522 | A1 | 4/2014 | Kataoka et al. |
| 2015/0309984 | A1 | 10/2015 | Bradford |
| 2015/0347383 | A1 | 12/2015 | Willmore et al. |
| 2016/0070466 | A1 | 3/2016 | Chaudhri |
| 2016/0282956 | A1 | 9/2016 | Ouyang et al. |
| 2016/0299685 | A1 | 10/2016 | Zhai et al. |
| 2019/0034038 | A1* | 1/2019 | Rudchenko ............ G06F 3/013 |

FOREIGN PATENT DOCUMENTS

| | | |
|---|---|---|
| JP | 2014-10688 A | 1/2014 |
| JP | 2016-201071 A | 12/2016 |
| KR | 10-1426937 B1 | 8/2014 |
| KR | 10-2016-0003112 A | 1/2016 |
| KR | 10-2016-0093508 A | 8/2016 |
| WO | 2014/200736 A1 | 12/2014 |
| WO | 2016/153606 A1 | 9/2016 |

OTHER PUBLICATIONS

Communication dated Jun. 8, 2020, from the European Patent Office in counterpart European Application No. 18853823.5, pp. 2-7, 10 pages total.
Communication dated Sep. 28, 2021, issued by the Korean Intellectual Property Office in Korean Application No. 10-2017-0113345.
Mobileburn, "Swype for Android demo", Dec. 29, 2009, pp. 1-21, URL: <https://www.youtube.com/watch?v=mRUoWUhcRIE> (Year: 2009).
Communication dated May 31, 2022 issued by the European Patent Office in counterpart European Application No. 20 179 847.7.
Communication dated Mar. 30, 2023, issued by the Chinese National Intellectual Property Administration in Chinese Application No. 201880057497.7.
Communication issued on Sep. 27, 2023 by the China National Intellectual Property Administration in Chinese Patent Application No. 201880057497.7, total pp. 22.
Communication issued Mar. 5, 2024 by the China National Intellectual Property Administration in Chinese Patent Application No. 201880057497.7 total pages: 18.
Communication issued Mar. 21, 2024 by the European Patent Office in European Patent Application No. 18853823.5 total pages: 59.
Communication issued Mar. 4, 2024 by the European Patent Office in European Patent Application No. 20179847.7 total pages: 51.

* cited by examiner

SYSTEM AND METHOD OF DETERMINING INPUT CHARACTERS BASED ON SWIPE INPUT

CROSS-REFERENCE TO RELATED APPLICATION(S)

This application a continuation application of U.S. patent application Ser. No. 15/995,841, filed Jun. 1, 2018, which claims priority under 35 U.S.C. § 119 to U.S. Provisional Application No. 62/514,136, filed on Jun. 2, 2017, in the U.S. Patent and Trademark Office, and Korean Patent Application No. 10-2017-0113345, filed on Sep. 5, 2017, in the Korean Intellectual Property Office, the disclosures of which are incorporated by reference herein in their entireties.

BACKGROUND

1. Field

The disclosure relates to systems and methods of determining input characters based on a swipe input, and more particularly, to a system and method of determining input characters based on a swipe input passing through a plurality of keys on a keyboard.

2. Description of Related Art

An artificial intelligence (AI) system is a computer system capable of exhibiting human-level or near human-level intelligence. The AI system is a system in which a machine trains itself, determines, and becomes smarter, unlike an existing rule-based smart system. By incorporating the AI system, a recognition rate may increase and a user preference may be more accurately estimated, and thus, the existing rule-based smart system is gradually being replaced by a deep-learning-based AI system.

AI technology includes machine learning and element technologies using the machine learning. The machine learning is an algorithm technology that self-classifies and learns features of input data. An element technology is a technology for simulating functions of a human brain, such as recognition and determination, by using a machine learning algorithm, such as deep-learning, and includes technical fields of linguistic understanding, visual understanding, inference/prediction, knowledge representation, and operation control.

Various fields to which the AI technology is applied are as follows. Verbal understanding is technology to recognize languages/characters of people and apply/process the languages/characters, and includes natural language processing, machine translation, a dialog system, questions and answers, or voice recognition/synthesis. Visual understanding is technology to recognize an object like in human vision, and includes object recognition, object tracing, image search, person recognition, scene understanding, space understanding, or image improvement. Inference/prediction is technology to logically infer and predict information by determining the information, and includes knowledge/probability-based inference, optimization prediction, preference-based plans, or recommendation. Knowledge representation is technology to automate experience information to knowledge data, and includes knowledge building (data generation/classification) or knowledge management (data application). Operation control is technology to control automatic driving of a vehicle or movement of a robot, and includes movement control (e.g., navigation, collision avoidance, driving) or manipulation control (e.g., behavior control).

Meanwhile, with the development of network technology, a user is now able to conveniently use a desired service anytime and anywhere by using a device, and accordingly, the importance of a user interface provided through the device is being greatly emphasized.

In particular, the device provides a touch-based software keyboard, and the user is now able to conveniently input characters through a swipe input with respect to the touch-based software keyboard.

However, since a trajectory of the swipe input that is input by the user may not be uniform, when the user inputs characters to the device through the swipe input, a character not intended by the user may be input to the device.

SUMMARY

Provided are a system and method of determining input characters by analyzing a trajectory formed on a keyboard, based on a swipe input.

Provided are a system and method of determining input characters, which effectively use a trained model for determining input characters according to a swipe input, by normalizing a keyboard and a trajectory on the keyboard.

Provided are a system and method of determining input characters by using a trained model capable of adjusting an amount of information.

Additional aspects will be set forth in part in the description which follows and, in part, will be apparent from the description, or may be learned by practice of the presented embodiments.

In accordance with an aspect of the disclosure, a device for processing a keyboard input, based on training, may include: a screen; a memory storing at least one instruction; and a processor configured to execute the at least one instruction to: display a keyboard on the screen of the device; receive a swipe input of a user, the swipe input connecting a plurality of keys on the displayed keyboard; extract a trajectory connecting the plurality of keys, based on the swipe input; apply, to a trained model for the keyboard input, based on the trajectory, trajectory information indicating a shape of the trajectory and a relative position of the trajectory with respect to the keyboard; and determine at least one character corresponding to the trajectory, based on a result of the applying the trajectory input.

In accordance with another aspect of the disclosure, a method of processing, by a device, a keyboard input, based on training, may include: displaying a keyboard on a screen of the device; receiving a swipe input of a user, the swipe input connecting a plurality of keys on the displayed keyboard; extracting a trajectory connecting the plurality of keys, based on the swipe input; applying, to a trained model for the keyboard input, based on the trajectory, trajectory information indicating a shape of the trajectory and a relative position of the trajectory with respect to the keyboard; and determining at least one character corresponding to the trajectory, based on a result of the applying the trajectory information.

In accordance with another aspect of the disclosure, there is provided a non-transitory computer-readable recording medium having recorded thereon instructions which, when executed by a processor, cause the processor to perform the methods above.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
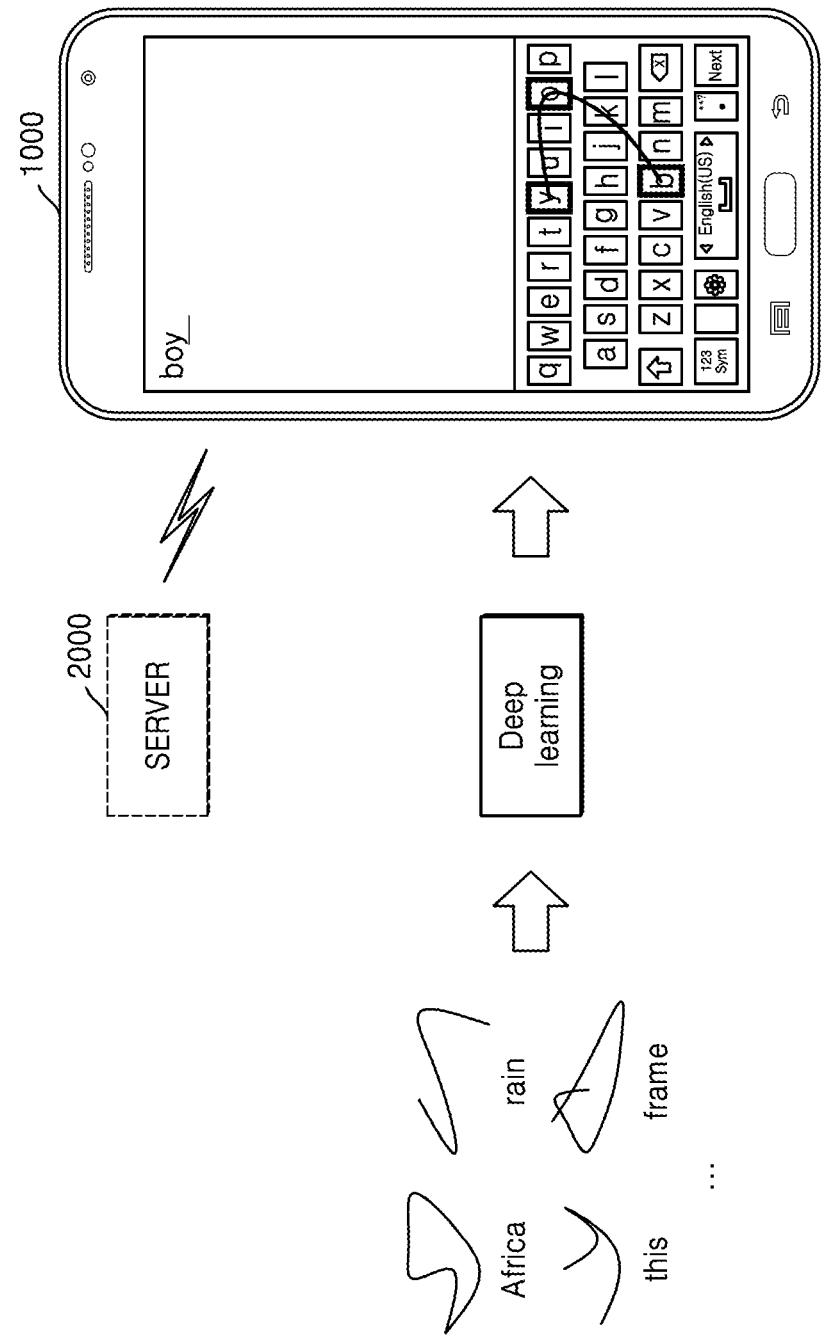
FIG. 1 is a diagram for describing an example of a device determining characters corresponding to a swipe of a user on a keyboard, according to an embodiment.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects. In the drawings, elements irrelevant to the description are not shown for clearer description, and like elements denote like reference numerals throughout the specification.

In the specification, when a region is "connected" to another region, the regions may not only be "directly connected," but may also be "electrically connected" via another device therebetween. Also, when a region "includes" an element, the region may further include another element instead of excluding the other element, unless stated otherwise.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments will be described in detail with reference to the accompanying drawings.

FIG. 1 is a diagram for describing an example of a device 1000 determining characters corresponding to a swipe of a user on a keyboard, according to an embodiment.

Referring to FIG. 1, the device 1000 may determine at least one character corresponding to a swipe input of a user input to a keyboard, by using a trained model that is trained based on a trajectory corresponding to certain characters. The trained model may be a data determination model used to determine at least one character corresponding to a trajectory passing through a plurality of keys on the keyboard. The data determination model may be a model based on, for example, a neural network. A model, such as a deep neural network (DNN), a recurrent neural network (RNN), or a bidirectional recurrent deep neural network (BRDNN) may be used as the data determination model, but the data determination model is not limited thereto. Also, the at least one character may form, for example, a word or an emoticon, but is not limited thereto.

The device 100 may detect the trajectory passing through a plurality of keys on the keyboard, based on the swipe input of the user with respect to the keyboard displayed on a screen of the device 1000, and apply information about the detected trajectory to the trained model.

Also, the device 1000 may apply trajectories formed on keyboards displayed in various forms to the trained model by normalizing the trajectories passing through the plurality of keys on the keyboards, and apply the normalized trajectories to the trained model.

The trained model may be stored in the device 1000, but is not limited thereto. The trained model may be stored in a server 2000, and in this case, the device 1000 may provide the information about the detected trajectory to the server 2000 and the server 2000 may apply the information about the detected trajectory received from the device 1000 to the trained model.

Also, the device 1000 may determine the at least one character corresponding to the detected trajectory through the trained model, and display the at least one character on the screen of the device 1000. The device 1000 may refine the trained model by applying the swipe input of the user and the at least one character corresponding to the trajectory of the swipe input to the trained model.

Figure 2:
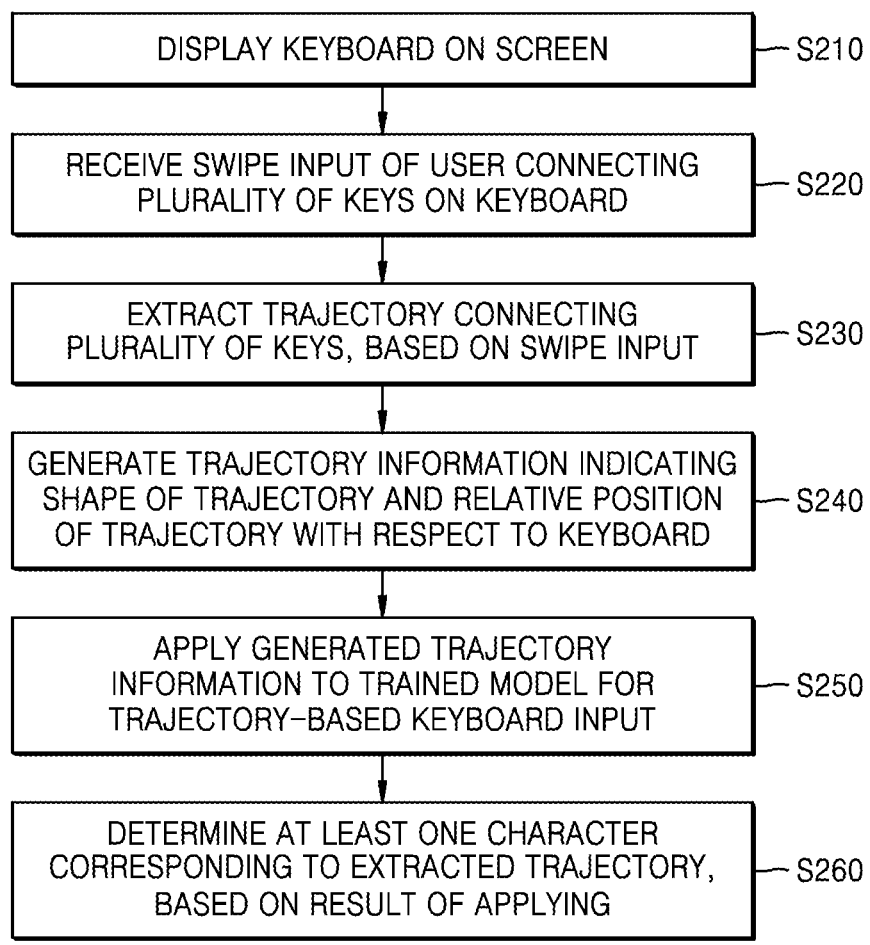
FIG. 2 is a flowchart of a method of determining, by a device, characters, based on a swipe input of a user, according to an embodiment.

FIG. 2 is a flowchart of a method of determining, by the device 1000, characters, based on a swipe input of a user, according to an embodiment.

In operation S210, the device 1000 may display a keyboard on a screen of the device 1000. When a user of the device 1000 is to input a character to the device 1000, the device 1000 may display a software keyboard on the screen of the device 1000.

The keyboard may have a layout of any one of various languages, such as Korean, English, Chinese, and Japanese. Also, the keyboard may be, for example, a QWERTY keyboard, a QWERTZ keyboard, an AZERTY keyboard, a QZERTY keyboard, a DVORAK keyboard, or a COLEMAK keyboard. Also, the keyboard may have any shape. In this case, shapes, sizes, intervals, and arrangement of keys on the keyboard may vary.

In operation S220, the device 1000 may receive a swipe input of the user connecting a plurality of keys on the keyboard.

For example, in order to input a word, the user may select a plurality of characters via a touch-drag-drop input. For example, in order to input a word including three characters, the user may touch a first key with a finger, drag the finger to second and third keys, and then lift the finger on the third key.

In operation S230, the device 1000 may extract a trajectory connecting the plurality of keys, based on the swipe input. The device 1000 may detect the trajectory of the finger touching the keyboard, based on the swipe input.

In operation S240, the device 1000 may generate trajectory information indicating a shape of the trajectory and a relative position of the trajectory with respect to the keyboard.

The device 1000 may generate, for example, coordinate information of the keyboard and coordinate information of the trajectory. The coordinate information of the keyboard may indicate the shape and size of the keyboard, and for example, may be coordinate values indicating borders around the keyboard and each individual key. Also, the coordinate information of the trajectory may indicate the shape and size of the trajectory formed in the keyboard, and for example, may be coordinate values of points forming the trajectory.

Also, the device 1000 may generate an image in which the keyboard and the trajectory formed on the keyboard are captured. In this case, the captured image may indicate the shape and size of the keyboard and the shape and size of the trajectory.

Also, the trajectory information may include information indicating a formation direction of the trajectory. For example, when the swipe input of the user sequentially passed through 'b', 'o', and 'y', the trajectory information may include information indicating that the trajectory of the swipe input is formed in a direction from 'b' to 'y' through 'o'.

However, the trajectory information generated by the device 1000 is not limited thereto, and the device 1000 may generate and process various types of information to indicate the shape of the trajectory and the relative position of the trajectory with respect to the keyboard.

In operation S250, the device 1000 may apply the generated trajectory information to a trained model for a trajectory-based keyboard input.

The trained model may be pre-set (i.e., predetermined) and stored in the device 1000. In this case, the server 2000 generating and operating the trained model may provide the trained model to the device 1000, and the device 1000 may store and manage the trained model received from the server 2000.

Also, the pre-set trained model may be stored in the server 2000. In this case, the device 1000 may provide the trajectory information to the server 2000, and receive word information determined based on the trajectory information from the server 2000. Also, in this case, the trained model may be managed by the server 2000 according to users.

The pre-set trained model may be pre-trained by using word information corresponding to various trajectories. For example, trajectories corresponding to various words included in a dictionary may be generated, and the pre-set trained model may be trained by using trajectory information of the generated trajectories and word information corresponding to the generated trajectories.

Also, various trajectories corresponding to a certain word in a dictionary may be pre-generated. In this case, the various trajectories may be generated through various algorithms. For example, straight edges, curved edges, Ferguson curves, Bezier curves, B-spline curves may be used to generate trajectories.

Also, the trained model may be trained by using, for example, a gated recurrent unit (GRU) algorithm in which an amount of information is adjusted by using a plurality of gates. Also, the trained model may be trained by using, for example, a gated recurrent unit (GRU), and the misarrangement (e.g., typographical error) and omission of characters forming a word may be compensated for by using a connectionist temporal classification (CTC) algorithm. However, an algorithm used to train the trained model is not limited thereto, and any one of various types of algorithms may be used.

In operation S260, the device 1000 may determine at least one character corresponding to the extracted trajectory, based on a result of the operation S250. The device 1000 may obtain a word corresponding to the trajectory from the trained model by applying the trajectory information to the trained model. Also, the device 1000 may display the obtained word on the screen of the device 1000. Also, the trained model may be refined based on the applied trajectory information and the application result.

At least one of operations S210 through S260 may be performed by a keyboard application installed in the device 1000 or by a separate application interworking with the keyboard application, but is not limited thereto.

Figure 3:
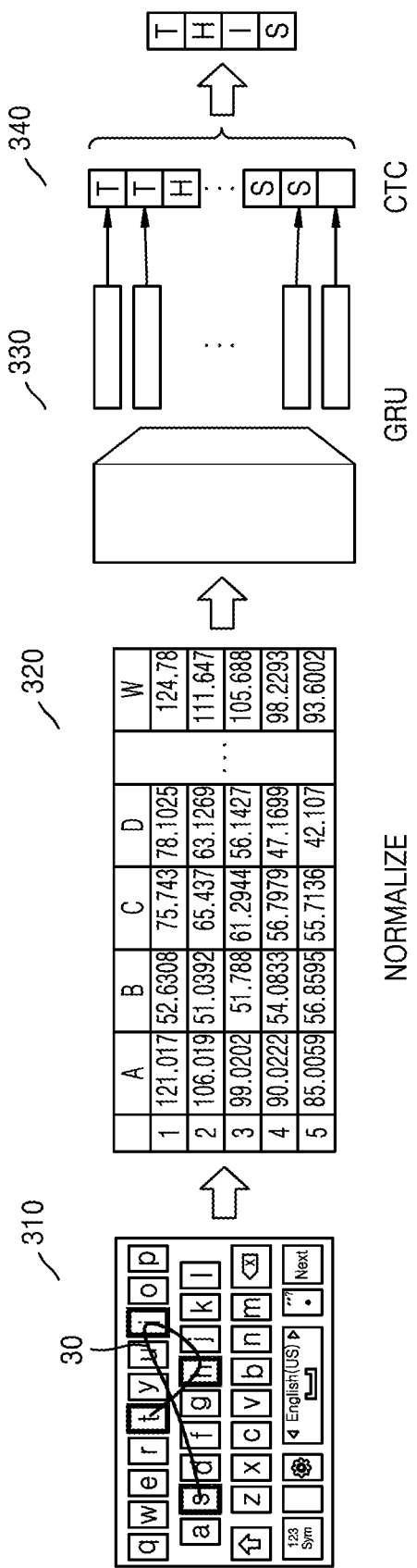
FIG. 3 is a diagram for describing an example of a device determining characters corresponding to a swipe input by normalizing a trajectory extracted from the swipe input, according to an embodiment.

FIG. 3 is a diagram for describing an example of the device 1000 determining characters corresponding to a swipe input by normalizing a trajectory extracted from the swipe input, according to an embodiment.

As indicated by reference numeral 310, the user may touch 't' on the keyboard displayed on the screen of the device 1000 with a finger, and sequentially drag the finger to 'h', 'I', and 's'. In this case, the device 1000 may extract a trajectory 30 of the finger.

As indicated by reference numeral 320, the device 1000 may generate trajectory information from the trajectory 30, and normalize the trajectory 30. The device 1000 may normalize the trajectory 30 by enlarging or reducing the size of the keyboard displayed on the screen of the device 1000 to a pre-set size. At this time, the size of the trajectory 30 may also be enlarged or reduced at the same ratio with respect to the keyboard. For example, if the size of the keyboard were to be scaled by the factor of 0.8, then the overall size and dimensions of the trajectory 30 may also be scaled by the factor of 0.8. The horizontal scaling and the vertical scaling may have different ratios. For example, the keyboard and/or the trajectory may be horizontally scaled by the factor of 0.9 (e.g., reduction) while being vertically scaled by the factor of 1.2 (e.g., enlargement).

As indicated by reference numerals 330 and 340, the device 100 may determine that a word corresponding to the trajectory 30 is "this" by applying the trajectory information of the normalized trajectory to a trained model. In this case, for example, the trajectory information may be applied to a GRU-based trained model, and a result value output from the GRU-based trained model may be applied to a CTC-based trained model.

Figure 4:
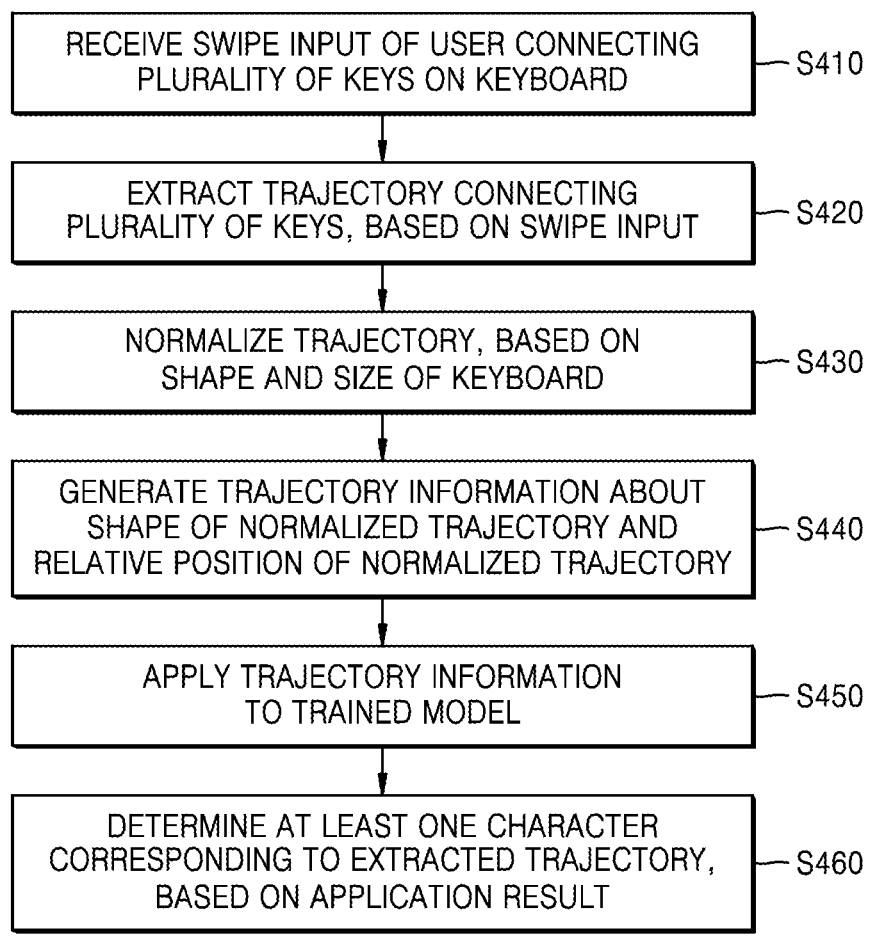
FIG. 4 is a flowchart of a method of normalizing, by a device, a trajectory extracted from a swipe input, and determining characters corresponding to the swipe input, based on the normalized trajectory, according to an embodiment.

FIG. 4 is a flowchart of a method of normalizing, by the device 1000, a trajectory extracted from a swipe input, and determining characters corresponding to the swipe input, based on the normalized trajectory, according to an embodiment.

In operation S410, the device 1000 may receive the swipe input of the user connecting the plurality of keys on the keyboard, and in operation S420, the device 1000 may extract the trajectory across the plurality of keys, based on the swipe input.

Since operations S410 and S420 of FIG. 2 respectively correspond to operations S220 and S230 of FIG. 2, details thereof are not provided again.

In operation S430, the device 1000 may normalize the extracted trajectory, based on the shape and size of the keyboard. The device 1000 may normalize the trajectory by enlarging or reducing the size of the keyboard displayed on the screen of the device 1000 to a pre-set size. At this time, the size of the trajectory may also be enlarged or reduced by the same ratio as the keyboard.

For example, when the device 1000 generates coordinate information of the keyboard and coordinate information of the trajectory as trajectory information, coordinate values indicating the border of the keyboard and coordinate values indicating the trajectory on the keyboard may be enlarged or reduced (e.g., in horizontal and/or vertical directions) at the same ratio. At this time, a relative position of the trajectory with respect to the keyboard may be maintained.

Also, for example, when the device 1000 captures an image of the keyboard and the trajectory formed on the keyboard, the device 1000 may enlarge or reduce the image (e.g., in horizontal and/or vertical directions). At this time, the relative position of the trajectory with respect to the keyboard may be maintained.

In operation S440, the device 1000 may generate trajectory information (e.g., normalized trajectory information) about the shape of the normalized trajectory and the relative position of the normalized trajectory. The device 1000 may normalize the keyboard and the trajectory on the keyboard to obtain the trajectory information indicating the shape of the normalized trajectory and the relative position of the normalized trajectory with respect to the normalized keyboard.

In operation S450, the device 1000 may apply the trajectory information to a trained model. The device 1000 may apply the trajectory information about the normalized trajectory to the trained model. For example, the device 1000 may apply the trajectory information about the shape of the normalized trajectory and the relative position of the normalized trajectory with respect to the normalized keyboard to the trained model.

In operation S460, the device 1000 may determine at least one character corresponding to the extracted trajectory, based on an application result. The device 1000 may obtain a word output from the trained model and display the obtained word on the screen of the device 1000.

Figure 5:
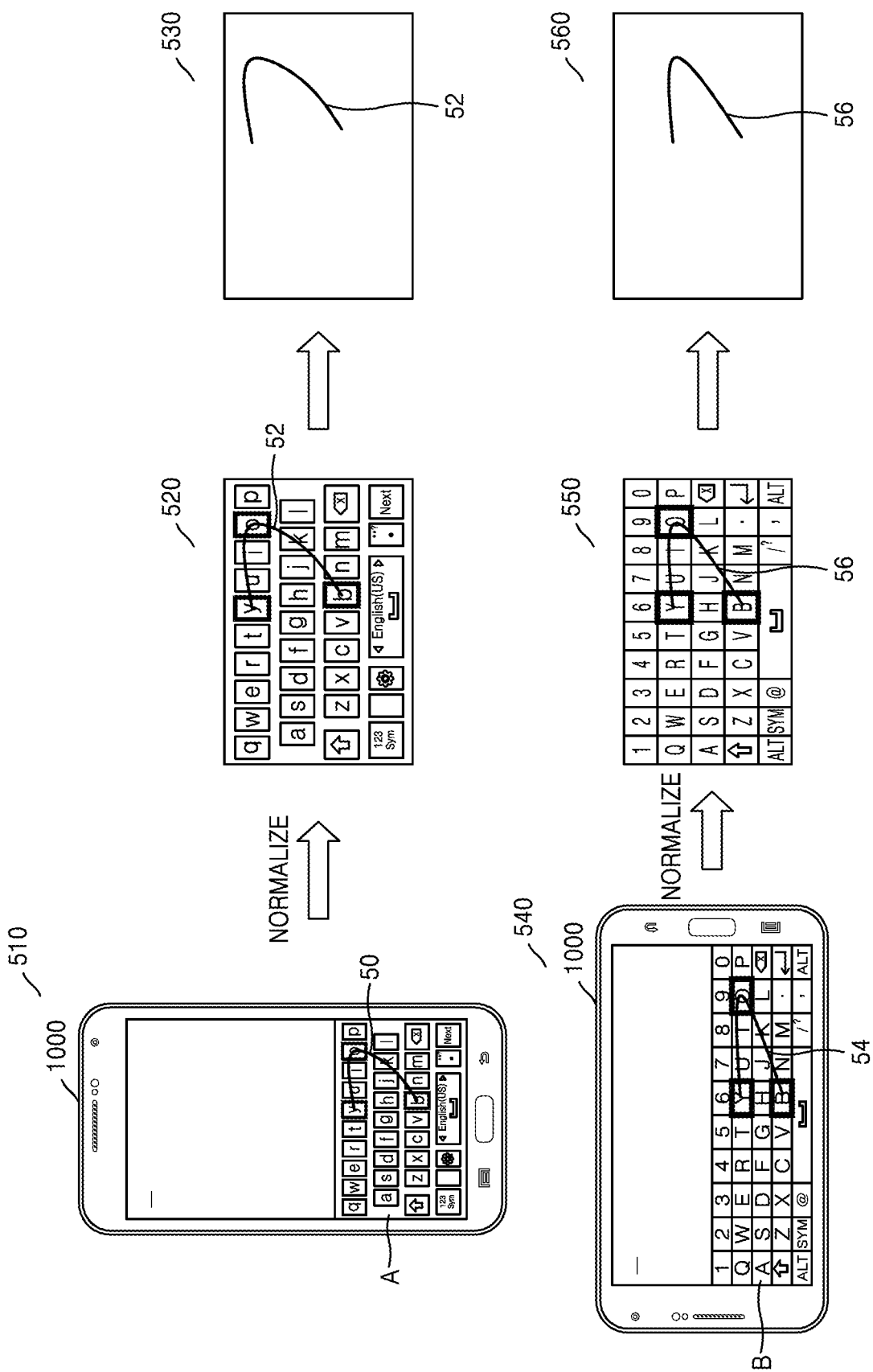
FIG. 5 is a diagram for describing an example of normalizing swipe inputs on different keywords and trajectories according to the swipe inputs, according to an embodiment.

FIG. 5 is a diagram for describing an example of normalizing swipe inputs on different keywords and trajectories according to the swipe inputs, according to an embodiment.

FIG. 5 illustrates examples of normalizing trajectories according to swipe inputs on keyboards when the device 1000 is in a vertical mode and in a horizontal mode.

As indicated by reference numeral 510, when the device 1000 is in the vertical orientation, a keyboard A is displayed on the screen of the device 1000 and the user may form a trajectory 50 on the keyboard A via a swipe input.

As indicated by reference numeral 520, the device 1000 may normalize the size of the keyboard A to a pre-set size, and accordingly, also normalize the trajectory 50 to a normalized trajectory 52. The size of the trajectory 50 may be scaled (e.g., enlarged or reduced) at the same ratio as the keyboard A.

Accordingly, the normalized keyboard A and the normalized trajectory 52 may be configured as indicated by reference numeral 530. Also, the device 1000 may obtain information about the shape and size of the normalized trajectory 52, and a position of the normalized trajectory 52 on the normalized keyboard A.

As indicated by reference numeral 540, when the device 1000 is in the horizontal orientation, a keyboard B is displayed on the screen of the device 1000 and the user may form a trajectory 54 on the keyboard B via a swipe input. The keyboard B may have a different design from the keyboard A. Intervals between keys, and sizes, shapes, and arrangements of the keys of the keyboards A and B may be different from each other.

As indicated by reference numeral 550, the device 1000 may normalize the size of the keyboard B to a pre-set size (e.g., the same uniform shape and size as the keyboard 520), and accordingly, also normalize the trajectory 54 to a normalized trajectory 56. The size of the trajectory 54 may be enlarged or reduced at the same ratio (e.g., horizontally and/or vertically) as the keyboard B.

Accordingly, the normalized keyboard B and the normalized trajectory 56 may be configured as indicated by reference numeral 560. Also, the device 1000 may obtain information about the shape and size of the normalized trajectory 56, and a position of the normalized trajectory 56 on the normalized keyboard B.

As shown in FIG. 5, a keyboard and a trajectory on the keyboard may be normalized regardless of a type of the keyboard, and trajectory information of the normalized trajectory may pertain to various keyboards and various input modes. Also, the device 1000 may autonomously learn standards and criteria of determining characters corresponding to a trajectory of a swipe input with respect to a keyboard regardless of a type and size of the keyboard.

Figure 6:
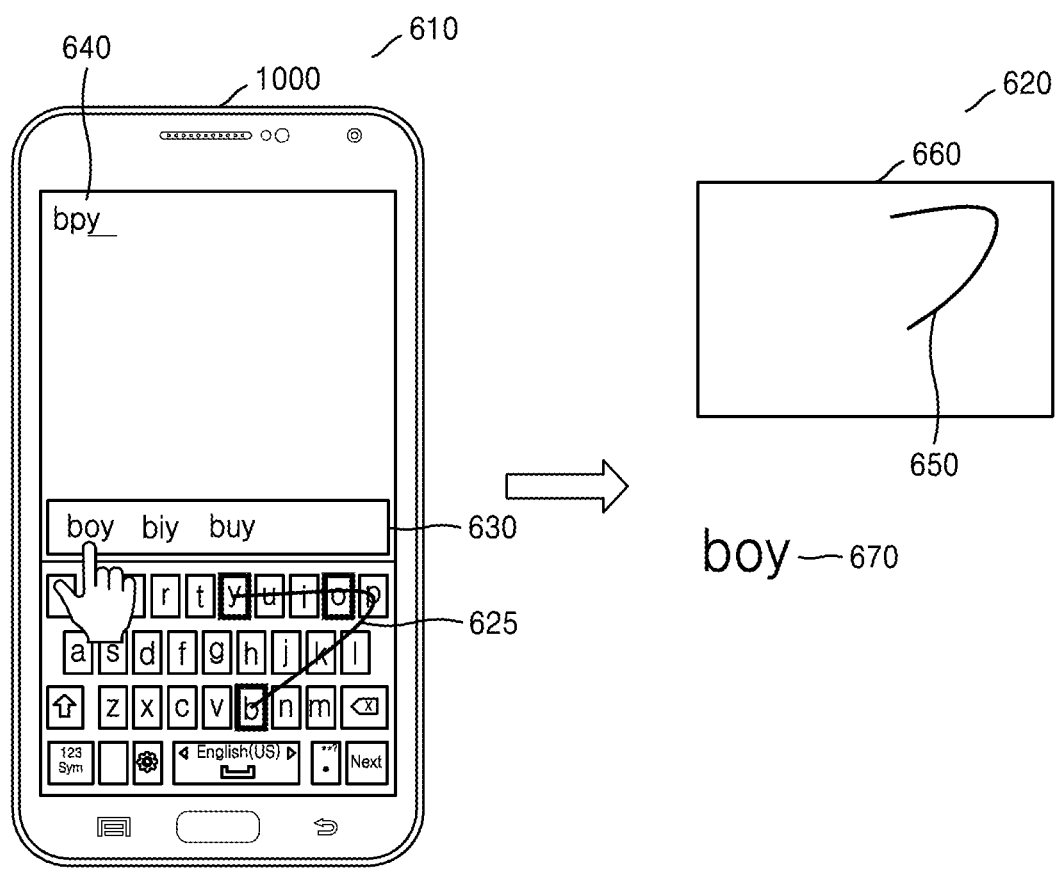
FIG. 6 is a diagram for describing an example of a device recommending characters corresponding to a swipe input of a user, and generating data used to refine a trained model based on selection by the user with respect to the recommended characters, according to an embodiment.

FIG. 6 is a diagram for describing an example of the device 1000 recommending characters corresponding to a swipe input of a user, and generating data used to refine a trained model based on selection by the user with respect to the recommended characters, according to an embodiment.

As indicated by reference numeral 610, for example, when the user who wishes to input 'boy' inputs a wrong swipe input and thus a trajectory 625 is formed in an order of 'b', 'p', and 'y', the device 1000 may display 'bpy' 640 on a key input window. Also, the device 1000 may display, in a region 630, recommended words 'boy', 'biy', and 'buy' that are determined to be inputs intended by the user. Also, when the user selects 'boy' from the recommended words, the device 1000 may determine 'boy' as a word input by the user.

As indicated by reference numeral 620, the device 1000 may normalize the trajectory 625 to a normalized trajectory 650, and match information about the normalized trajectory 650 and a normalized keyboard 660 to an input word 'boy' 670. Also, the device 1000 may refine a trained model by applying the input word 'boy' 670 to the trained model together with the information about the normalized trajectory 650 and the normalized keyboard 660.

Accordingly, when the user later inputs a swipe input forming a trajectory in an order of 'b', 'p', and 'y', the device 1000 may determine that a word to be input by the user is 'boy' by using the refined trained model.

Figure 7:
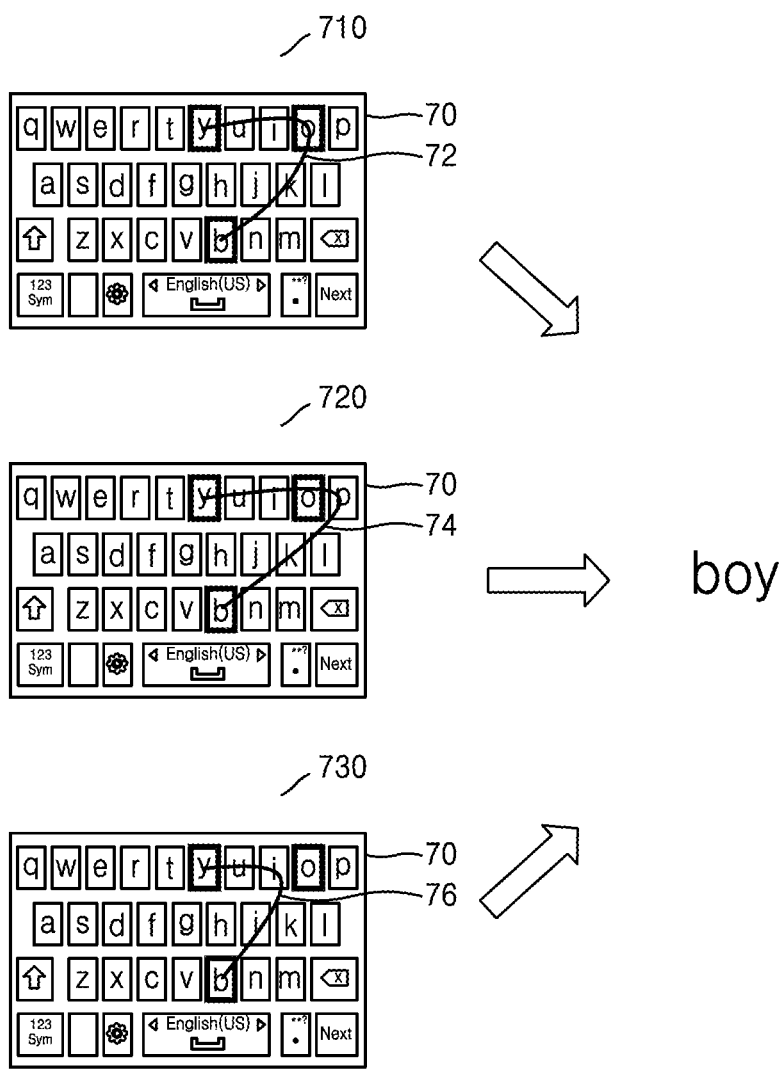
FIG. 7 is a diagram for describing an example of a plurality of trajectories corresponding to certain characters, according to an embodiment.

FIG. 7 is a diagram for describing an example of a plurality of trajectories corresponding to certain characters, according to an embodiment.

As indicated by reference numeral 710, a user who wishes to input 'boy' may input a swipe input forming a trajectory 72 in an order of 'b', 'o', and 'y'.

At this time, the user who wishes to input 'boy' may input a wrong swipe input and thus a trajectory of the wrong swipe input may not accurately pass through 'b', 'o', and 'y'. For example, as indicated by reference numeral 720, the user may input a swipe input forming a trajectory 74 in an order of 'b', 'p', and 'y'. Alternatively, for example, as indicated by reference numeral 730, the user may input a swipe input forming a trajectory 76 in an order of 'b', 'i', and 'y'.

Since the device 1000 according to an embodiment may refine a trained model by matching a trajectory of a wrong swipe input to a word intended by a user, the device 1000 is able to determine that a word corresponding to the wrong swipe inputs indicated by the reference numerals 720 and 730 is 'boy'.

Figure 8:
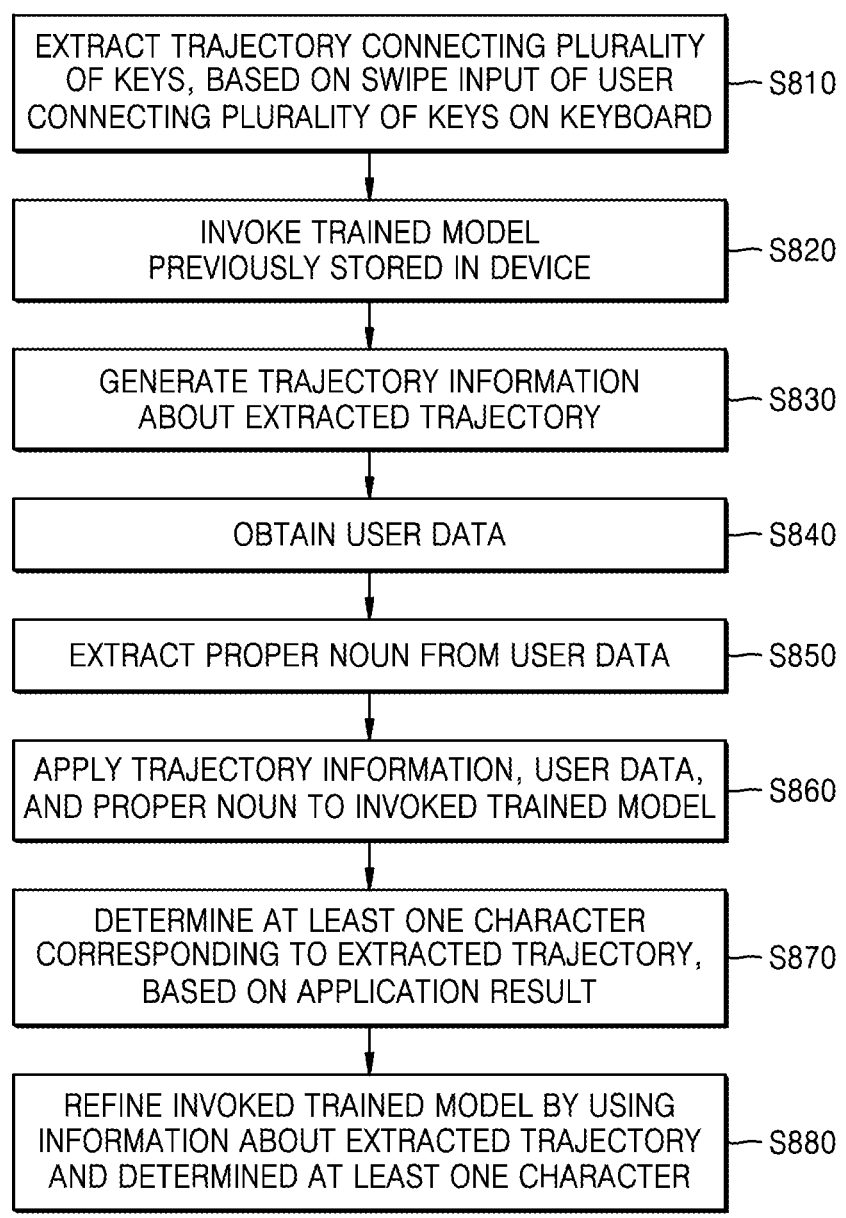
FIG. 8 is a flowchart of a method of determining, by a device, characters corresponding to a swipe input by using information related to a user, and refining a trained model, according to an embodiment.

FIG. 8 is a flowchart of a method of determining, by the device, characters corresponding to a swipe input by using information related to a user, and refining a trained model, according to an embodiment.

In operation S810, the device 1000 may extract a trajectory connecting a plurality of keys, based on a swipe input of a user connecting the plurality of keys on a keyboard.

In operation S820, the device 1000 may invoke a trained model previously stored in the device 1000. The trained model previously stored in the device 1000 may be generated by the server 2000 and previously provided to the device 1000. Also, the previously stored trained model may be generated and refined based on swipe inputs of various users and words corresponding to the swipe inputs.

In operation S830, the device 1000 may generate trajectory information about the extracted trajectory. Also, the device 1000 may normalize the extracted trajectory.

In operation S840, the device 1000 may obtain user data.

The user data may include, for example, text uploaded by the user via a social network service (SNS), contact information stored in the device 1000, text messages transmitted or received through the device 1000 (e.g., messages written by the user), information about a text input history of the user, and memo information stored in the device 1000, but is not limited thereto.

The device 1000 may obtain text input through various applications in the device 1000 via user inputs. In this case, an application (e.g., a keyboard application) for determining trajectories of swipe inputs and words corresponding to the trajectories may be pre-authorized to obtain input text from other applications.

When another application is installed in the device 1000 after the keyboard application is installed in the device 1000, the device 1000 may display, on the screen of the device 1000, a graphical user interface (GUI) for receiving, from the other application, a user input of selecting whether to grant permission to obtain input text from the keyboard application. Also, it may be determined whether to assign, to the keyboard application, permission to obtain text from the other application, based on a selection input of the user.

In operation S850, the device 1000 may extract a proper noun from the user data. Examples of the proper noun include a personal name, a business name, a product name, or a place name, but are not limited thereto. Also, the device 1000 may assign a greater weight to a proper noun that is repeatedly extracted.

In operation S860, the device 1000 may apply the trajectory information, the user data, and the proper noun to the invoked trained model, and in operation S870, the device 1000 may determine at least one character corresponding to the extracted trajectory, based on an application result.

In operation S880, the device 1000 may refine the invoked trained model by using information about the extracted trajectory and the determined at least one character.

Figure 9:
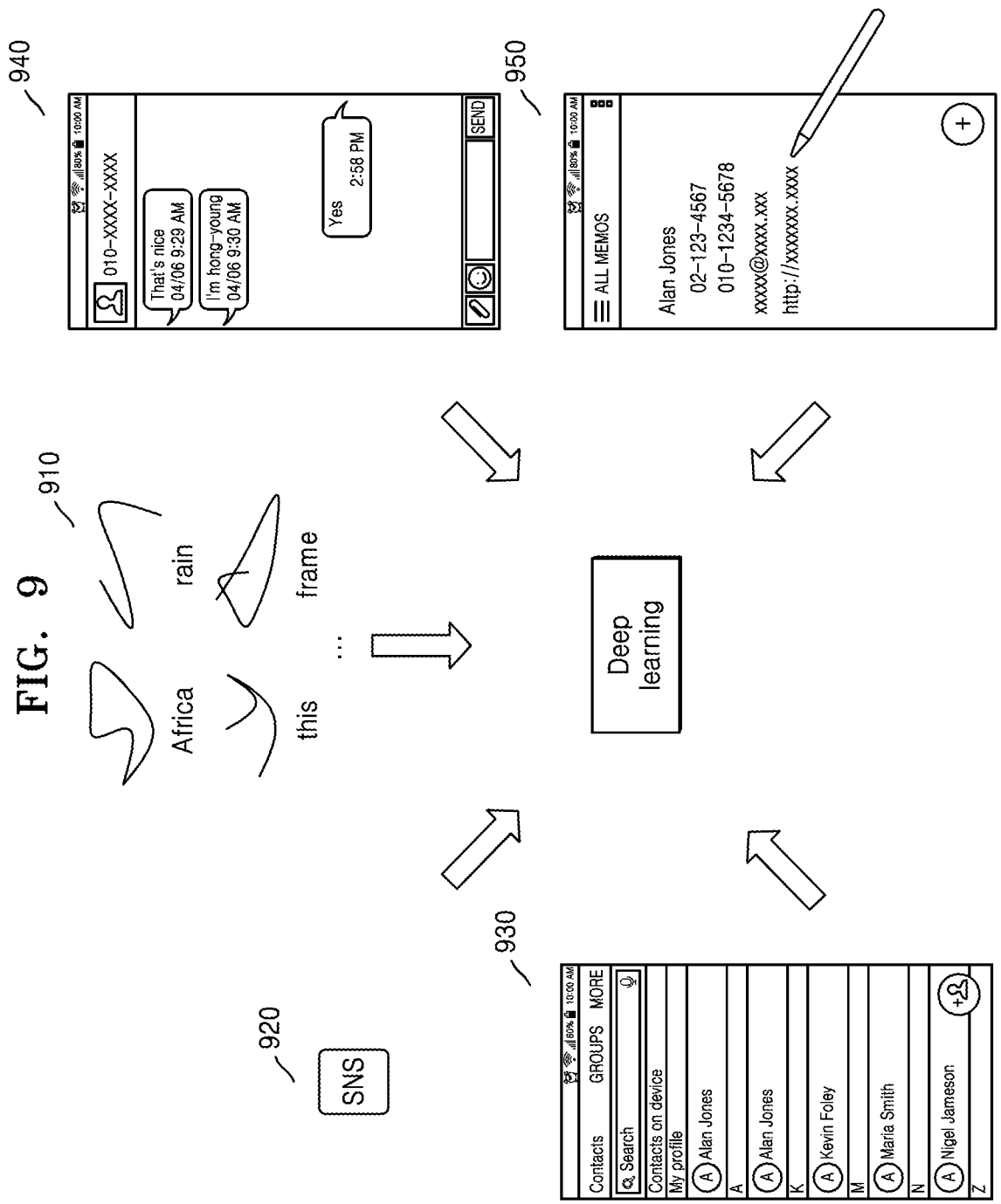
FIG. 9 is a diagram for describing an example of a device performing training for a keyword input by additionally considering user data, according to an embodiment.

FIG. 9 is a diagram for describing an example of the device 1000 performing training for a keyword input by additionally considering user data, according to an embodiment.

Referring to FIG. 9, a trained model may be refined by using information 910 about trajectories input by a user by using a keyboard and words corresponding to the trajectories. Also, user data, such as information 920 about text uploaded by the user through an SNS, contact information 830 included in an address book stored in the device 1000, information 940 about messages transmitted or received through the device 1000, and information 950 about text input through a memo application executed by the device 1000, may be input to the trained model, and the trained model may be refined by further considering the input user data.

Figure 10:
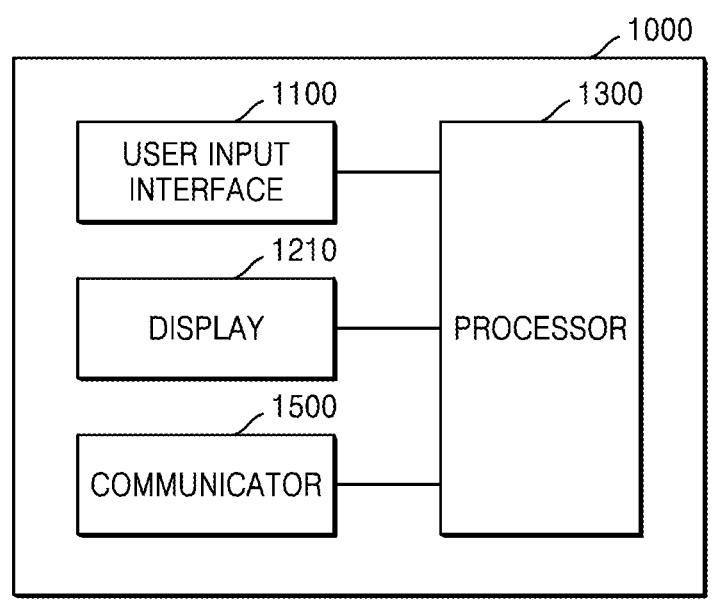
FIGS. 10 and 11 are block diagrams of a device according to embodiments.
Figure 11:
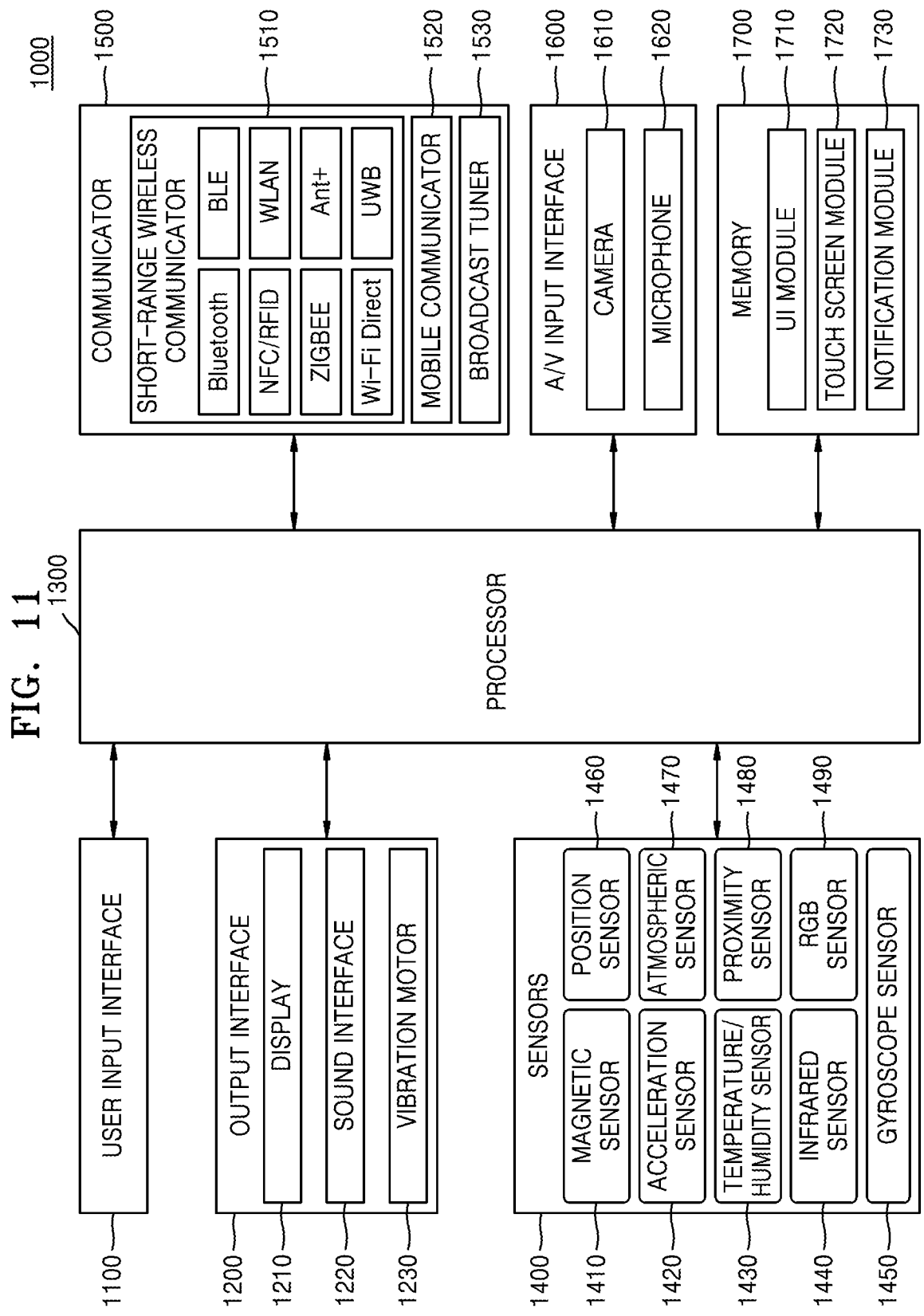

FIGS. 10 and 11 are block diagrams of the device 1000 according to embodiments.

As shown in FIG. 10, the device 1000 according to an embodiment may include a user input interface 1100, a display 1210, a processor 1300, and a communicator 1500. However, the components shown in FIG. 10 are not all essential components of the device 1000. The device 1000 may include more or fewer components than those shown in FIG. 10.

For example, as shown in FIG. 11, the device 1000 according to an embodiment may include, in addition to the user input interface 1100, an output interface 1200, the processor 1300, and the communicator 1500, sensors 1400, an audio/video (NV) input interface 1600, and a memory 1700.

The user input interface 1100 is a unit for a user to input data for controlling the device 1000. Examples of the user input interface 1100 include a keypad, a dome switch, a touch pad (e.g., a touch capacitance type, a pressure resistance film type, an infrared light detecting type, a surface ultrasound conducting type, an integral tension measuring type, or a piezo-effect type), a jog wheel, and a jog switch, but are not limited thereto.

The user input interface 1100 may receive a swipe input of the user selecting a plurality of keys on a software keyboard.

The output interface 1200 may output an audio signal, a video signal, or a vibration signal, and may include the display 1210, a sound interface 1220, and a vibration motor 1230.

The display 1210 may display information processed by the device 1000 and present it to the user. For example, the display 1210 may display the software keyboard (also known as a virtual keyboard). Also, the display 1210 may display a user interface (UI) for determining input characters, based on the swipe input on the software keyboard, and a UI for training a trained model related to the swipe input.

Meanwhile, when the display 1210 is configured as a touch screen by forming a layer structure with a touch pad, the display 1210 may also be used as an input device as well as an output device. The display 1210 may include at least one of a liquid crystal display (LCD), a thin-film-transistor liquid-crystal display (TFT-LCD), an organic light-emitting diode (OLED), a flexible display, a three-dimensional (3D) display, and an electrophoretic display. Also, according to an embodiment of the device 1000, the device 1000 may include at least two displays 1210.

The sound interface 1220 outputs audio data received from the communicator 1500 or stored in the memory 1700.

The vibration motor 1230 may output a vibration signal. Also, the vibration motor 1230 may output a vibration signal when a touch screen is touched.

The processor 1300 generally controls overall operations of the device 1000. For example, the processor 1300 may execute programs stored in the memory 1700 to generally control the user input interface 1100, the output interface 1200, the sensors 1400, the communicator 1500, and the A/V input interface 1600.

In detail, the processor 1300 may display a keyboard on the screen of the device 1000. The device 1000 may display the software keyboard on the screen of the device 1000 when the user wishes to input at least one character to the device 1000. The keyboard may have a layout of any one of various languages, such as Korean, English, Chinese, and Japanese. Also, the keyboard may be, for example, a QWERTY keyboard, a QWERTZ keyboard, an AZERTY keyboard, a QZERTY keyboard, a DVORAK keyboard, or a COLEMAK keyboard.

The processor 1300 may receive a swipe input of the user connecting a plurality of keys on the keyboard, and may extract a trajectory connecting the plurality of keys, based on the swipe input.

The processor 1300 may generate trajectory information indicating a shape of the trajectory and a relative position of the trajectory with respect to the keyboard. The processor 1300 may generate, for example coordinate information of the keyboard and coordinate information of the trajectory. The coordinate information of the keyboard may indicate the shape and size of the keyboard, and for example, may be coordinate values indicating the borders of the keyboard and/or its constituent keys. Also, the coordinate information of the trajectory may indicate the shape and size of the trajectory, and for example, may be coordinate values of points forming the trajectory.

Also, the processor 1300 may generate, for example, an image by capturing the keyboard and the trajectory formed on the keyboard. In this case, the image may indicate the shape and size of the keyboard, and the shape and size of the trajectory.

However, the trajectory information generated by the processor 1300 is not limited thereto, and the processor 1300 may generate and process various types of information to indicate the shape of the trajectory and the relative position of the trajectory with respect to the keyboard.

Also, the processor 1300 may normalize the extracted trajectory, based on the shape and size of the keyboard. The processor 1300 may normalize the trajectory information by enlarging or reducing the size of the keyboard displayed on the screen of the device 1000 to a pre-set size. At this time, the size of the trajectory may be scaled (e.g., enlarged or reduced) at the same ratio with respect to the keyboard.

The processor 1300 may generate the trajectory information indicating the shape of the normalized trajectory and the relative position of the normalized trajectory. The processor 1300 may normalize the keyboard and the trajectory to obtain the trajectory information indicating the relative position of the normalized trajectory with respect to the normalized keyboard and the shape of the normalized trajectory.

The processor 1300 may apply the trajectory information to a trained model for a trajectory-based keyboard input. The trajectory information applied to the trained model may be information about the normalized trajectory, but is not limited thereto. The trajectory information before normalization may be applied to the trained model.

The trained model may be pre-set and stored in the device 1000. In this case, the server 2000 generating and operating the trained model may provide the trained model to the device 1000, and the processor 1300 may store, in the device 1000, and manage the trained model received from the server 2000.

Also, the pre-set trained model may be stored in the server 2000. In this case, the processor 1300 may provide the trajectory information to the server 2000 and receive word information determined based on the trajectory information from the server 2000. Also, in this case, the server 2000 may manage the trained model according to users.

The processor 1300 may determine at least one character corresponding to the extracted trajectory. The processor 1300 may apply the trajectory information to the trained model to obtain, from the trained model, a word corresponding to the trajectory. Also, the processor 1300 may display the obtained word on the screen of the device 1000. Also, the trained model may be refined based on the trajectory information and an application result.

The processor 1300 may perform the operations described above by executing a keyboard application installed in the device 1000. Alternatively, the processor 1300 may execute a separate application interworking with the keyboard application to preform the above operations. However, an embodiment is not limited thereto.

Meanwhile, the processor 1300 may obtain user data. The user data may include, for example, text uploaded by the user through SNS, contact information stored in the device 1000, text messages transmitted or received through the device 1000, and memo information stored in the device 1000, but is not limited thereto.

The processor 1300 may obtain text input through various applications in the device 1000 via user inputs. In this case, an application (e.g., the keyboard application) for determining trajectories of swipe inputs and words corresponding to the trajectories may be pre-authorized (e.g., previously been given permission) to obtain input text from other applications. The authority related to functions of an application may be managed by the processor 1300.

When another application is installed in the device 1000 after the keyboard application is installed in the device 1000, the processor 1300 may display, on the screen of the device 1000, a GUI for receiving, from the other application, a user input of selecting whether to grant permission to the keyboard application to obtain input text. Also, it may be determined whether to grant permission to the keyboard application to obtain text from the other application, based on a selection input of the user.

The processor 1300 may extract a proper noun from the user data. Examples of the proper noun include a personal name, a business name, a product name, or a place name, but are not limited thereto. Also, the processor 1300 may assign a greater weight to a proper noun that is repeatedly extracted.

The processor 1300 may apply the trajectory information, the user data, and the proper noun to the trained model, and may determine at least one character corresponding to the trajectory, based on the application result.

The processor 1300 may refine the trained model by using information about the trajectory and the determined at least one character.

The sensors 1400 may detect a state of the device 1000 or a state around the device 1000, and transmit the detected state to the processor 1300.

The sensors 1400 may include at least one of a magnetic sensor 1410, an acceleration sensor 1420, a temperature/humidity sensor 1430, an infrared sensor 1440, a gyroscope sensor 1450, a position sensor 1460 (e.g., global positioning system GPS)), an atmospheric sensor 1470, a proximity sensor 1480, and a red-green-blue (RGB) sensor 1490 (e.g., illuminance sensor), but is not limited thereto.

The communicator 1500 may include at least one component enabling the device 1000 to communicate with the server 2000 or an external apparatus. For example, the communicator 1500 may include a short-range wireless interface 1510, a mobile interface 1520, and a broadcast tuner 1530.

The short-range wireless interface 1510 may include a Bluetooth interface, a Bluetooth Low Energy (BLE) interface, a near-field communication (NFC) interface, a wireless local area network (WLAN) (Wi-Fi) interface, a Zigbee interface, an Infrared Data Association (IrDA) interface, a Wi-Fi direct (WFD) interface, an ultra-wideband (UWB) interface, and an Ant+ interface, but is not limited thereto.

The mobile interface 1520 may transmit and receives a wireless signal to and from at least one of a base station, an external terminal, and a server, on a mobile communication network. Here, the wireless signal may include data having various formats according to transmission and reception of a voice call signal, a video telephone call signal, or a text/multimedia message.

The broadcast tuner 1530 may receive a broadcast signal and/or broadcast related information from an external source, through a broadcast channel. The broadcast channel may include a satellite channel or a terrestrial broadcasting channel. According to an embodiment, the device 1000 may not include the broadcast tuner 1530.

Also, the communicator 1500 may transmit or receive, to or from the server 2000 and an external device, information required to determine input characters of the user corresponding to the swipe input on the keyboard.

The A/V input interface 1600 may receive an audio signal or a video signal, and may include a camera 1610 and a microphone 1620. The camera 1610 may obtain an image frame of a still image or a moving image via an image sensor in a video telephone mode or a photographing mode. An image captured via the image sensor may be processed by the processor 1300 or a separate image processor.

The microphone 1620 may receive an external sound signal and process the external sound signal to generate electric voice data. For example, the microphone 1620 may receive a sound signal from an external device or a human speaker.

The memory 1700 may store programs for processes and controls of the processor 1300, and may store data input to or output from the device 1000. The memory 1700 may store the trained model used to determine input characters corresponding to a swipe input. Also, the memory 1700 may store various types of user data for training and refining the trained model.

The memory 1700 may include at least one type of storage medium from among a flash memory, a hard disk, a multimedia card micro-type memory, a card-type memory (e.g., a secure digital (SD) card or an extreme digital (XD) card), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk.

Programs stored in the memory 1700 may be classified into a plurality of modules based on functions, and may be classified as a UI module 1710, a touch screen module 1720, and a notification module 1730. These and other modules shown in FIG. 11 and other figures may be implemented with software (e.g., instructions, commands, data, code, firmware, program, application, etc.), hardware (e.g., circuits, microchips, processors, etc.), or a combination of both.

The UI module 1710 may provide a specialized UI or GUI linked to the device 1000 according to applications. The touch screen module 1720 may detect a touch gesture of a user on a touch screen, and transmit information about the touch gesture to the processor 1300. The touch screen module 1720 according to an embodiment may recognize and analyze a touch code. The touch screen module 1720 may be configured as separate hardware including a controller.

Various sensors may be arranged inside or around the touch screen to detect a touch or a proximity touch on the touch screen. An example of a sensor for detecting a touch on the touch screen includes a tactile sensor. The tactile sensor detects contact that can be felt by a person on a certain object. The tactile sensor may detect various types of information, such as roughness of a contact surface, rigidness of a contact object, and temperature of a touch point.

Examples of a touch gesture of a user include a tap, a touch and hold, a double tap, a drag, panning, a flick, a drag-and-drop, and a swipe.

The notification module 1730 may generate a signal for notifying event generation in the device 1000.

Figure 12:
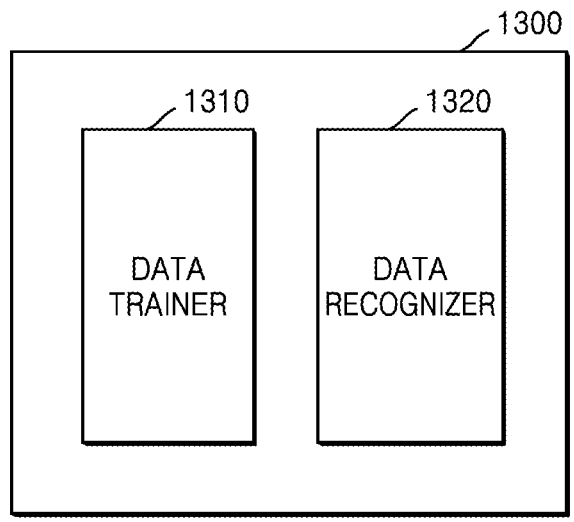
FIG. 12 is a block diagram of a processor according to an embodiment.

FIG. 12 is a block diagram of the processor 1300 according to an embodiment.

Referring to FIG. 12, the processor 1300 according to an embodiment may include a data trainer 1310 and a data recognizer 1320. These and other components shown in FIG. 11 and other figures may be implemented with software (e.g., instructions, commands, data, code, firmware, program, application, etc.), hardware (e.g., circuits, microchips, processors, etc.), or a combination of both.

The data trainer 1310 may learn standards (e.g., criteria, rules, parameters, thresholds, etc.) for determining at least one character corresponding to a trajectory of a swipe input. The data trainer 1310 may learn standards about which data is to be used to determine characters input to a keyboard through a swipe input, and how to determine input characters by using data. The data trainer 1310 may learn standards for determining situations by obtaining data to be used for learning, and applying the obtained data to a data determination model described below.

The data recognizer 1320 may determine input characters based on data. The data recognizer 1320 may recognize input characters from certain data by using the data determination model. The data recognizer 1320 may determine the input characters based on the certain data by obtaining the certain data according to standards pre-set (i.e., previously determined) via learning, and using the data determination model, in which the obtained certain data is used as an input value. Also, a result value output from the data determination model as such may be used to refine the data determination model.

At least one of the data trainer 1310 and the data recognizer 1320 may be manufactured in a form of at least one hardware chip and included in an electronic apparatus. For example, at least one of the data trainer 1310 and the data recognizer 1320 may be manufactured in a form of a dedicated artificial intelligence (AI) hardware chip (e.g., an AI accelerator, an AI chip, etc.) or may be manufactured as part of an existing general-purpose processor (e.g., a central processing unit (CPU) or an application processor (AP)) or a dedicated graphics processor (e.g., a graphics processing unit (GPU)), and included in any electronic apparatus.

In this case, the data trainer 1310 and the data recognizer 1320 may be included in one electronic apparatus or in different electronic apparatuses. For example, one of the data trainer 1310 and the data recognizer 1320 may be included in an electronic apparatus and the other one may be included in a server. Alternatively, in the data trainer 1310 and the data recognizer 1320, model information built by the data trainer 1310 may be provided to the data recognizer 1320 or data input to the data recognizer 1320 may be provided to the data trainer 1310 as additional training data, via wires or wirelessly.

Meanwhile, at least one of the data trainer 1310 and the data recognizer 1320 may be implemented in a software module. When at least one of the data trainer 1310 and the data recognizer 1320 is implemented in a software module (or a program module including an instruction), the software module may be stored in a non-transitory computer-readable recording medium. The software module may be provided by an operating system (OS) or a certain application. Alternatively, a part of the software module may be provided by an OS and the remainder of the software module may be provided by a certain application.

Figure 13:
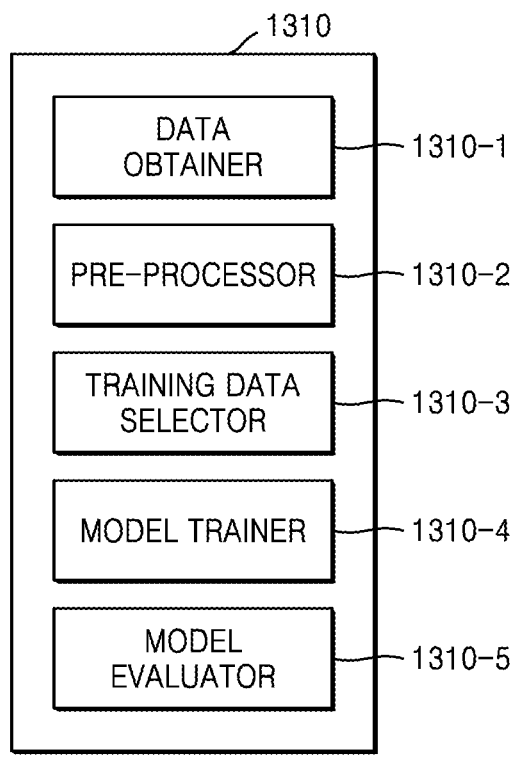
FIG. 13 is a block diagram of a data learner according to an embodiment.

FIG. 13 is a block diagram of the data trainer 1310 according to an embodiment.

Referring to FIG. 13, the data trainer 1310 according to an embodiment may include a data obtainer 1310-1, a pre-processor 1310-2, a training data selector 1310-3, a model trainer 1310-4, and a model evaluator 1310-5.

The data obtainer 1310-1 may obtain data required to determine input characters based on a swipe input. The data obtainer 1310-1 may obtain data required for learning determination of input characters based on a swipe input.

The data obtainer 1310-1 may obtain word information corresponding to several trajectories. For example, trajectories corresponding to various words included in a dictionary may be generated, and the data obtainer 1310-1 may obtain trajectory information about the generated trajectories and word information corresponding to the generated trajectories.

Also, various trajectories corresponding to a certain word in a dictionary may be pre-generated. In this case, the various trajectories may be generated through various algorithms. For example, straight edges, curved edges, Ferguson curves, Bezier curves, B-spline curves may be used to generate trajectories. At this time, the trajectories may be generated with respect to various types of keyboards.

Also, the data obtainer 1310-1 may obtain various types of user data. The user data may include, for example, text uploaded by a user through SNS, contact information stored in the device 1000, text messages transmitted or received through the device 1000, and memo information stored in the device 1000, but is not limited thereto.

The pre-processor 1310-2 may pre-process the obtained data such that the obtained data is used for learning determination of input characters. The pre-processor 1310-2 may process the obtained data to a pre-set format such that the model trainer 1310-4 uses the obtained data to learn situation determination. The pre-processor 1310-2 may normalize the trajectory, based on the shape and size of the keyboard. The pre-processor 1310-2 may enlarge or reduce the size of the keyboard to a pre-set size to normalize trajectory information about the trajectory on the keyboard. In this case, the size of the trajectory may also be enlarged or reduced by the same rate as the keyboard.

For example, when the trajectory information is coordinate information of the keyboard and coordinate information of the trajectory, the pre-processor 1310-2 may enlarge or reduce coordinate values indicating the border of the keyboard and coordinate values indicating the trajectory on the keyboard by the same ratio. In this case, a relative position of the trajectory with respect to the keyboard may be maintained.

Also, for example, when the trajectory information is an image obtained by capturing the trajectory on the keyboard, the pre-processor 1310-2 may enlarge or reduce the captured image. In this case, the relative position of the trajectory with respect to the keyboard may be maintained. Also, the pre-processor 1310-2 may pre-process the user data to a pre-set format.

The training data selector 1310-1 may select data required for learning from pre-processed data. The selected data may be provided to the model trainer 1310-4. The training data selector 1310-3 may select the data required for learning from the pre-processed data, based on standards pre-set to determine input characters. Also, the training data selector 1310-3 may select the data based on standards pre-set via learning of the model trainer 1310-4 described below.

The model trainer 1310-4 may learn standards (e.g., criteria, rules, parameters, thresholds, etc.) of how to determine input characters according to a swipe input, based on training data. Also, the model trainer 1310-4 may learn standards of which training data to use to determine input characters.

Also, the model trainer 1310-4 may train a data determination model used to determine input characters by using the training data. In this case, the data determination model may be a pre-built (e.g., preloaded, manufacturer-made, etc.) model. For example, the data determination model may be a model pre-built by receiving basic training data.

The data determination model may be built considering an application field of the data determination model, a training purpose, or a computer performance of an apparatus. The data determination model may be, for example, a neural network-based model. For example, a deep neural network (DNN), a recurrent neural network (RNN), or a bidirectional recurrent deep neural network (BRDNN) may be used as the data determination model, but an embodiment is not limited thereto.

According to an embodiment, when there are a plurality of pre-built data determination models, the model trainer 1310-4 may determine, as a data determination model to be trained, a data determination model having high relevance between input training data and basic training data. In this case, the basic training data may be pre-classified according to data types, and the data determination models may be pre-built according to data types.

Also, the model trainer 1310-4 may train, for example, the data determination model by using a training algorithm including error back-propagation or gradient descent.

Also, the model trainer 1310-4 may train the data determination model via, for example, supervised learning that uses training data as an input value. Also, the model trainer 1310-4 may train the data determination model via unsupervised learning, in which standards for determining a situation are found by self-learning a type of data required to determine a situation without separate supervision. Also, the model trainer 1310-4 may train the data determination model via, for example, reinforcement learning that uses feedback about whether a result of determining a situation via learning is correct.

Also, the data determination model may be trained by using, for example, a GRU algorithm in which an amount of information is adjusted by using a plurality of gates. Also, the data determination model may be trained by using, for example, a GRU algorithm, and the misarrangement (e.g., typographical error) and omission of characters forming a word may be compensated for by using the CTC algorithm. However, an algorithm used to train the data determination model is not limited thereto, and any one of various types of algorithms may be used.

Also, after the data determination model is trained, the model trainer 1310-4 may store the trained data determination model. At this time, the model trainer 1310-4 may store the data determination model in a memory of the device 1000 including the data recognizer 1320. Alternatively, the model trainer 1310-4 may store the trained data determination model in a memory of the server 2000 connected to the device 1000 via a wired network or a wireless network.

Here, the memory in which the trained data determination model is stored may also store, for example, a command or data related to another at least one component of the device 1000. Also, the memory may store software and/or a program. The program may include, for example, a kernel, middleware, an application programming interface (API) and/or an application program (or "application").

The model evaluator 1310-5 may input evaluation data into the data determination model, and when recognition results output from the evaluation data do not satisfy a certain standard, enable the model trainer 1310-4 to train the data determination model again. Here, the evaluation data may be data pre-set to evaluate the data determination model.

For example, the model evaluator 1310-5 may determine that the recognition results do not satisfy the certain standard when the number or proportion of pieces of evaluation data of which recognition results are not accurate exceeds a pre-set threshold value, from among recognition results of the trained data determination model with respect to the evaluation data. For example, when the certain standard is 2% and the trained data determination model outputs incorrect recognition results with respect to over 20 pieces of evaluation data from among 1000 pieces of evaluation data, the model evaluator 1310-5 may determine that the trained data determination model is not suitable.

Meanwhile, when there are a plurality of the trained data determination models, the model evaluator 1310-5 may evaluate whether each of the trained data determination models satisfies the certain standard, and determine the trained data determination model that satisfies the certain standard as a final data determination model. Here, when there are a plurality of data determination models that satisfy the certain standard, the model evaluator 1310-5 may determine, as the final data determination mode, one or a pre-set number of data determination models in an order of high evaluation scores.

Meanwhile, at least one of the data obtainer 1310-1, the pre-processor 1310-2, the training data selector 1310-3, the model trainer 1310-4, and the model evaluator 1310-5 in the data trainer 1310 may be manufactured in at least one hardware chip form and included in an electronic apparatus. For example, at least one of the data obtainer 1310-1, the pre-processor 1310-2, the training data selector 1310-3, the model trainer 1310-4, and the model evaluator 1310-5 may be manufactured to be in a dedicated AI hardware chip or may be manufactured as part of an existing general-purpose processor (e.g., a CPU or an application processor) or a dedicated graphics processor (e.g., a GPU), and included in any electronic apparatus described above.

Also, the data obtainer 1310-1, the pre-processor 1310-2, the training data selector 1310-3, the model trainer 1310-4, and the model evaluator 1310-5 may be included in one electronic apparatus or in different electronic apparatuses. For example, some of the data obtainer 1310-1, the pre-processor 1310-2, the training data selector 1310-3, the model trainer 1310-4, and the model evaluator 1310-5 may be included in an electronic apparatus, and the remainder may be included in a server.

Also, at least one of the data obtainer 1310-1, the pre-processor 1310-2, the training data selector 1310-3, the model trainer 1310-4, and the model evaluator 1310-5 may be implemented in a software module. When at least one of the data obtainer 1310-1, the pre-processor 1310-2, the training data selector 1310-3, the model trainer 1310-4, and the model evaluator 1310-5 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 14:
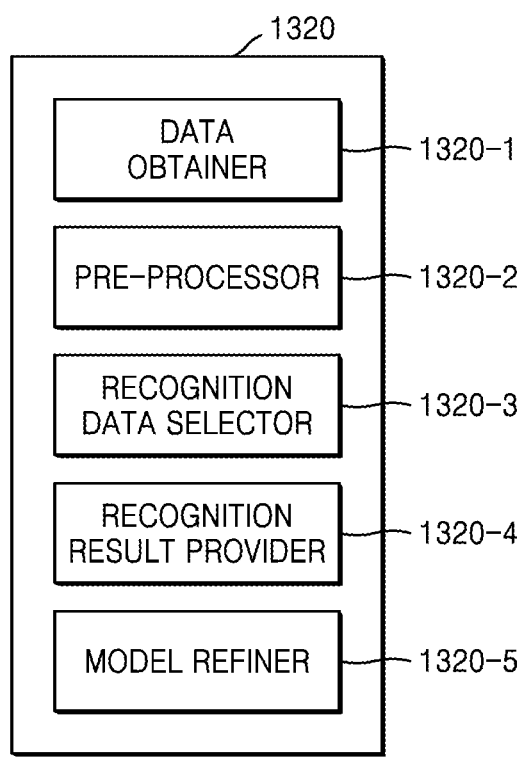
FIG. 14 is a data recognizer according to an embodiment.

FIG. 14 is the data recognizer 1320 according to an embodiment.

Referring to FIG. 14, the data recognizer 1320 according to an embodiment may include a data obtainer 1320-1, a pre-processor 1320-2, a recognition data selector 1320-3, a recognition result provider 1320-4, and a model refiner 1320-5.

The data obtainer 1320-1 may obtain data required to determine input characters based on a swipe input, and the pre-processor 1320-2 may pre-process the obtained data such that the obtained data is used to determine input characters. The pre-processor 1320-2 may process the obtained data to a pre-set format such that the recognition result provider 1320-4 may use the obtained data to determine input characters.

The recognition data selector 1320-3 may select data required to determine input characters from the pre-processed data. The selected data may be provided to the recognition result provider 1320-4. The recognition data selector 1320-3 may select some or all of the pre-processed data according to pre-set standards for situation determination. Also, the recognition data selector 1320-3 may select data according to standards pre-set via training of the model trainer 1310-4.

The recognition result provider 1320-4 may determine input characters by applying the selected data to a data determination model. The recognition result provider 1320-4 may provide a recognition result according to a recognition purpose of data. The recognition result provider 1320-4 may apply the selected data to the data determination model by using the data selected by the recognition data selector 1320-3 as an input value. Also, the recognition result may be determined by the data determination model.

The recognition result provider 1320-4 may determine input characters according to a swipe input by using trajectory information about a normalized trajectory as an input value of the data determination model. Also, the recognition result provider 1320-4 may determine input characters according to a swipe input by inputting, to the data determination model, at least some of information about text uploaded by a user through an SNS, contact information included in an address book stored in the device 1000, information about messages transmitted or received through the device 1000, and information about text input through a memo application executed in the device 1000.

The model refiner 1320-5 may refine the data determination model based on an evaluation with respect to the recognition result provided by the recognition result provider 1320-4. For example, the model refiner 1320-5 may provide the recognition result provided by the recognition result provider 1320-4 to the model trainer 1310-4 such that the model trainer 1310-4 may refine the data determination model.

Meanwhile, at least one of the data obtainer 1320-1, the pre-processor 1320-2, the recognition data selector 1320-3, the recognition result provider 1320-4, and the model refiner 1320-5 in the data recognizer 1320 may be manufactured in at least one hardware chip form and included in an electronic apparatus. For example, at least one of the data obtainer 1320-1, the pre-processor 1320-2, the recognition data selector 1320-3, the recognition result provider 1320-4, and the model refiner 1320-5 may be manufactured to be in a dedicated AI hardware chip or may be manufactured as part of an existing general-purpose processor (e.g., CPU or an application processor) or a dedicated graphics processor (e.g., GPU), and included in any electronic apparatus described above.

Also, at least one of the data obtainer 1320-1, the pre-processor 1320-2, the recognition data selector 1320-3, the recognition result provider 1320-4, and the model refiner 1320-5 may be included in one electronic apparatus or in different electronic apparatuses. For example, some of the data obtainer 1320-1, the pre-processor 1320-2, the recognition data selector 1320-3, the recognition result provider 1320-4, and the model refiner 1320-5 may be included in an electronic apparatus, and the remainder may be included in a server.

Also, at least one of the data obtainer 1320-1, the pre-processor 1320-2, the recognition data selector 1320-3, the recognition result provider 1320-4, and the model refiner 1320-5 may be implemented in a software module. When at least one of the data obtainer 1320-1, the pre-processor 1320-2, the recognition data selector 1320-3, the recognition result provider 1320-4, and the model refiner 1320-5 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 15:
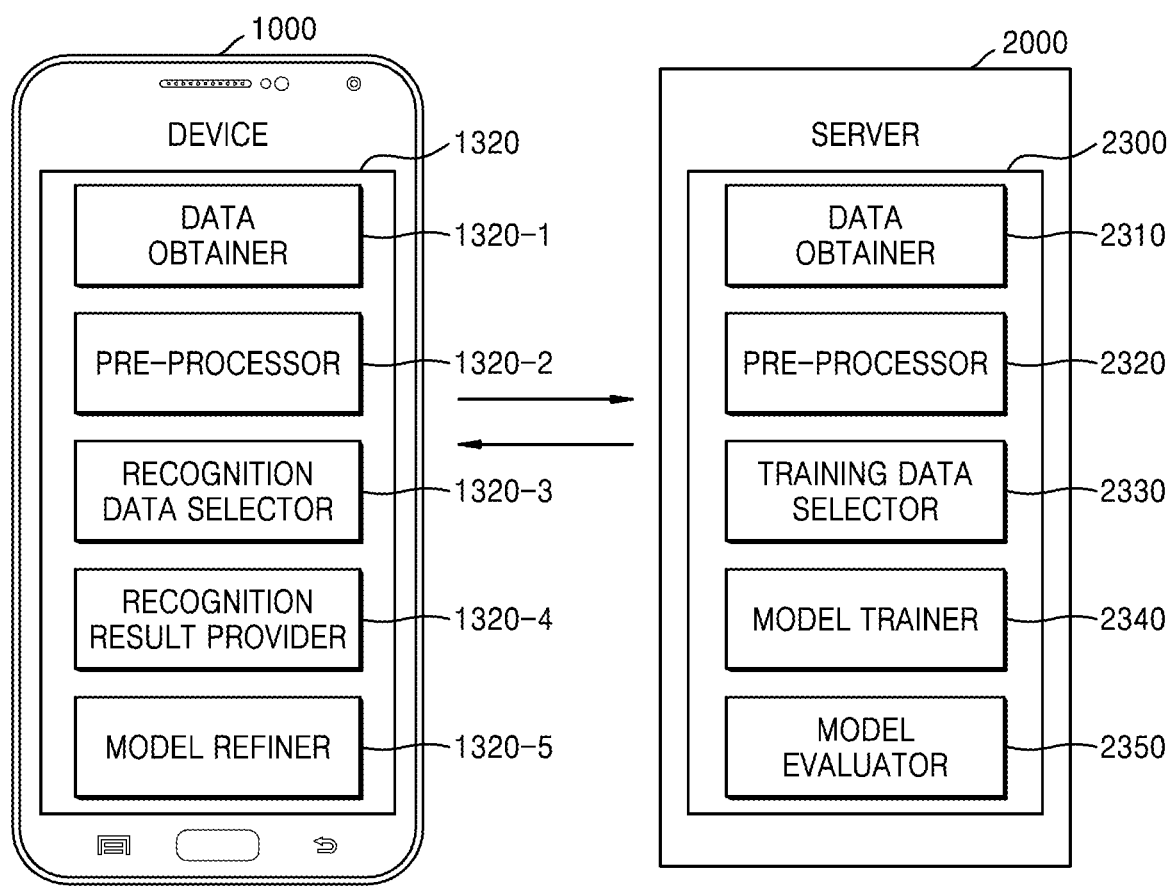
FIG. 15 is a diagram for describing an example of a device and a server interworking together to learn and recognize data, according to an embodiment.

FIG. 15 is a diagram for describing an example of the device 1000 and the server 2000 interworking together to learn and recognize data, according to an embodiment.

Referring to FIG. 15, the server 2000 may learn standards for determining input characters according to a swipe input, and the device 1000 may determine input characters according to a swipe input, based on a result of learning by the sever 2000.

In this case, a model trainer 2340 of the server 2000 may perform functions of the data trainer 1310 of FIG. 13. The model trainer 2340 of the server 2000 may learn standards about which data is to be used to determine input characters input, and how to determine input characters by using data. The model trainer 2340 may learn standards for determining input characters by obtaining data to be used for learning, and applying the obtained data to the data determination model.

Also, the recognition result provider 1320-4 of the device 1000 may determine input characters by applying data selected by the recognition data selector 1320-3 to the data determination model generated by the server 2000. For example, the recognition result provider 1320-4 may transmit data selected by the recognition data selector 1320-3 to the server 2000, and the recognition result provider 1320-4 requests the server 2000 to apply the data selected by the recognition data selector 1320-3 to the data determination model and to determine input characters. Also, the recognition result provider 1320-4 may receive, from the server 2000, information about the determined input characters.

Alternatively, the recognition result provider 1320-4 of the device 1000 may receive, from the server 2000, the data determination model generated by the server 2000, and determine the input characters by using the received data determination model. In this case, the recognition result provider 1320-4 of the device 1000 may determine the input characters by applying, to the data determination model received from the server 2000, the data selected by the recognition data selector 1320-3.

Some embodiments may also be realized in a form of a computer-readable recording medium, such as a program module executed by a computer, which includes computer-readable instructions. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and removable and non-removable media for storing information such as computer-readable instructions, data structures, program modules, and other data. The communication medium typically include a computer-readable instruction, a data structure, a program module, other data of a modulated data signal, or another transmission mechanism, and an example thereof includes an arbitrary information transmission medium.

Also, in the present specification, a "unit" or "module" may be a hardware component, such as a processor or a circuit, and/or a software component executed by a hardware component, such as a processor.

While the present disclosure has been particularly shown and described with reference to exemplary embodiments thereof, it will be understood by one of ordinary skill in the art that various changes in form and details may be made therein without departing from the technical ideas and essential features of the present disclosure. Hence, it will be understood that the embodiments described above are not limiting the scope of the disclosure. For example, each component described in a single type may be executed in a distributed manner, and components described distributed may also be executed in an integrated form.

The scope of the present disclosure is indicated by the claims which will be described in the following rather than the detailed description of the disclosure, and it should be understood that the claims and all modifications or modified forms drawn from the concept of the claims are included in the scope of the present disclosure.

What is claimed is:

1. A method of processing, by an electronic device, a keyboard input, the method comprising:

outputting, via a display, a first virtual keyboard;
obtaining a first swipe input on the output first virtual keyboard, wherein the first swipe input forms a first trajectory connecting a plurality of virtual keys on the output first virtual keyboard;
normalizing, based on a size and a shape of the first virtual keyboard, the first trajectory for applying the normalized first trajectory to a machine learning model;
obtaining, by applying the normalized first trajectory to the machine learning model, a first word corresponding to the first swipe input;
outputting, via the display, a second virtual keyboard being displayed differently from the first virtual keyboard;
obtaining a second swipe input on the output second virtual keyboard, wherein the second swipe input forms a second trajectory connecting a plurality of virtual keys on the output second virtual keyboard;
normalizing, based on a size and a shape of the second virtual keyboard, the second trajectory for applying the normalized second trajectory to the machine learning model which is used for the normalized first trajectory; and
obtaining, by applying the normalized second trajectory to the machine learning model which is used for the normalized first trajectory, a second word corresponding to the second swipe input,
wherein the first trajectory on the first virtual keyboard is different from the second trajectory on the second virtual keyboard, and
wherein the first word and the second word obtained from the machine learning model are a same word.

2. The method of claim 1, wherein the obtaining the first word comprises applying normalized coordinate information of the normalized first trajectory and normalized coordinate information of the first virtual keyboard to the machine learning model.

3. The method of claim 2, wherein the obtaining the first word further comprises applying information indicating a formation direction of the normalized first trajectory to the machine learning model.

4. The method of claim 1, wherein the normalizing the first trajectory comprises resizing the first virtual keyboard and the first trajectory on the first virtual keyboard to a pre-set size and a pre-set shape.

5. The method of claim 1, wherein the machine learning model is trained to recognize trajectory information of different swipe inputs, corresponding to a same word, with respect to a plurality of types of virtual keyboards including the first virtual keyboard and the second virtual keyboard.

6. The method of claim 1, wherein the machine learning model is trained by using at least one of a gated recurrent unit (GRU) algorithm or a connectionist temporal classification (CTC) algorithm.

7. An electronic device comprising:
a display;
a memory storing a machine learning model; and
at least one processor configured to:
control to output, via the display, a first virtual keyboard;
obtain a first swipe input on the output first virtual keyboard, wherein the first swipe input forms a first trajectory connecting a plurality of virtual keys on the output first virtual keyboard;
normalize, based on a size and a shape of the first virtual keyboard, the first trajectory for applying the normalized first trajectory to the machine learning model;
obtain, by applying the normalized first trajectory to the machine learning model, a first word corresponding to the first swipe input;
control to output, via the display, a second virtual keyboard being displayed differently from the first virtual keyboard;
obtain a second swipe input on the output second virtual keyboard, wherein the second swipe input forms a second trajectory connecting a plurality of virtual keys on the output second virtual keyboard;
normalize, based on a size and a shape of the second virtual keyboard, the second trajectory for applying the normalized second trajectory to the machine learning model which is used for the normalized first trajectory; and
obtain, by applying the normalized second trajectory to the machine learning model which is used for the normalized first trajectory, a second word corresponding to the second swipe input,
wherein the first trajectory on the first virtual keyboard is different from the second trajectory on the second virtual keyboard, and
wherein the first word and the second word obtained from the machine learning model are a same word.

8. The electronic device of claim 7, wherein the at least one processor is configured to obtain the first word by applying normalized coordinate information of the normalized first trajectory and normalized coordinate information of the first virtual keyboard to the machine learning model.

9. The electronic device of claim 8, wherein the at least one processor is configured to obtain the first word by applying information indicating a formation direction of the normalized first trajectory to the machine learning model.

10. The electronic device of claim 7, wherein the at least one processor is configured to resize the first virtual keyboard and the first trajectory on the first virtual keyboard to a pre-set size and a pre-set shape for normalizing the first trajectory.

11. The electronic device of claim 7, wherein the machine learning model is trained to recognize trajectory information of different swipe inputs, corresponding to a same word, with respect to a plurality of types of virtual keyboards including the first virtual keyboard and the second virtual keyboard.

12. The electronic device of claim 7, wherein the machine learning model is trained by using at least one of a gated recurrent unit (GRU) algorithm or a connectionist temporal classification (CTC) algorithm.

13. The electronic device of claim 7, wherein at least one of sizes, shapes or arrangements of keys of the first virtual keyboard and the second virtual keyboard are different from each other.

14. A computer program product comprising a computer readable storage medium comprising a computer readable program stored therein, wherein the computer readable program, when executed on a computing device, causes the computing device to:
output, via a display, a first virtual keyboard;
obtain a first swipe input on the output first virtual keyboard, wherein the first swipe input forms a first trajectory connecting a plurality of virtual keys on the output first virtual keyboard;

normalize, based on a size and a shape of the first virtual keyboard, the first trajectory for applying the normalized first trajectory to the machine learning model;
obtain, by applying the normalized first trajectory to a machine learning model, a first word corresponding to the first swipe input;
output, via the display, a second virtual keyboard being displayed differently from the first virtual keyboard;
obtain a second swipe input on the output second virtual keyboard, wherein the second swipe input forms a second trajectory connecting a plurality of virtual keys on the output second virtual keyboard;
normalize, based on a size and a shape of the second virtual keyboard, the second trajectory for applying the normalized second trajectory to the machine learning model which is used for the normalized first trajectory; and
obtain, by applying the normalized second trajectory to the machine learning model which is used for the normalized first trajectory, a second word corresponding to the second swipe input,
wherein the first trajectory on the first virtual keyboard is different from the second trajectory on the second virtual keyboard, and
wherein the first word and the second word obtained from the machine learning model are a same word.

* * * * *